United States Patent
Tailor et al.

(10) Patent No.: US 10,171,159 B1
(45) Date of Patent: Jan. 1, 2019

(54) DONOR SELECTION FOR RELAY ACCESS NODES USING REFERENCE SIGNAL BOOSTING

(71) Applicant: Sprint Spectrum LP, Overland Park, KS (US)

(72) Inventors: Pinalkumari Tailor, Ashburn, VA (US); Yun Sung Kim, Ashburn, VA (US); Sandeep Mangrulkar, Chantilly, VA (US); Dennis Canoy, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/451,769

(22) Filed: Mar. 7, 2017

(51) Int. Cl.
| H04B 7/14 | (2006.01) |
| H04B 7/155 | (2006.01) |
| H04L 5/00 | (2006.01) |
| H04W 52/36 | (2009.01) |
| H04W 28/02 | (2009.01) |

(52) U.S. Cl.
CPC ....... *H04B 7/15507* (2013.01); *H04L 5/0048* (2013.01); *H04W 28/0268* (2013.01); *H04W 52/367* (2013.01)

(58) Field of Classification Search
CPC . H04B 7/14; H04B 7/155; H04B 7/15; H04B 7/15507; H04B 7/15514; H04W 28/18; H04W 28/16; H04W 72/04; H04W 72/042; H04W 24/02; H04W 24/04; H04W 84/047; H04W 8/005; H04W 28/24

USPC .................................................. 455/7–25
See application file for complete search history.

(56) References Cited

U.S. PATENT DOCUMENTS

| 8,355,367 | B2 | 1/2013 | Han et al. | |
| 8,761,077 | B2 | 6/2014 | Kim et al. | |
| 9,119,107 | B2 | 8/2015 | Timus et al. | |
| 2012/0176958 | A1 | 7/2012 | Queseth et al. | |
| 2013/0064116 | A1* | 3/2013 | Speight | H04B 7/15528 370/252 |
| 2013/0223235 | A1* | 8/2013 | Hu | H04W 36/04 370/242 |
| 2014/0079020 | A1* | 3/2014 | Caverni | H04W 36/0083 370/331 |

* cited by examiner

*Primary Examiner* — Philip Sobutka

(57) ABSTRACT

A method for donor selection in a relay access node includes identifying a plurality of candidate donor access nodes and obtaining one or more characteristics associated with each of the plurality of candidate donor access nodes. The method further includes determining a primary donor access node based on a comparison of the one or more characteristics between each of the plurality of candidate donor access nodes, and receiving a reference signal transmitted by the primary donor access node at a transmission power higher than a transmission power of downlink information transmitted by the primary donor access node. One or more quality characteristics of the primary donor access node are evaluated, and based on the one or more quality characteristics meeting a predetermined threshold, a connection to the primary donor access node is requested. Devices and systems relate to donor selection.

20 Claims, 6 Drawing Sheets

DONOR SELECTION FOR RELAY ACCESS NODES USING REFERENCE SIGNAL BOOSTING

TECHNICAL BACKGROUND

As wireless networks evolve and grow, there are ongoing challenges in providing high-quality service to increasing numbers of wireless devices or user equipment (UE) in various coverage areas of a wireless network. One approach to improving service quality and coverage is to designate a wireless device as a relay node or relay UE for relaying communication between a base station or donor access node, and an end-user wireless device. Relay wireless devices may be used at the edge of a coverage area of a donor access node to improve coverage and/or service, as well as in crowded areas having a high number of other wireless devices to increase the available throughput to the end-user wireless devices being relayed. However, relay wireless devices may be limited in their ability to effectively service end-user wireless devices that are attached to it, particularly if the resources are limited from the donor access node providing the service, or if the relay wireless device is unable to determine a preferred donor access node from among a plurality of nearby access nodes.

OVERVIEW

Exemplary embodiments described herein include methods, systems, and devices for donor selection for a relay access node. A method for donor selection in a relay access node includes identifying a plurality of candidate donor access nodes, obtaining one or more characteristics associated with each of the plurality of candidate donor access nodes, determining a primary donor access node based on a comparison of the one or more characteristics between each of the plurality of candidate donor access nodes, receiving a reference signal transmitted by the primary donor access node at a transmission power higher than a transmission power of downlink information transmitted by the primary donor access node, evaluating one or more quality characteristics of the primary donor access node, and, based on the one or more quality characteristics meeting a predetermined threshold, requesting a connection to the primary donor access node.

A system for donor access node selection includes a relay access node configured to relay wireless services from a donor access node to one or more wireless devices and a processor communicatively coupled to the relay access node. The processor is to execute operations comprising ranking one or more candidate donor access nodes according to at least one characteristic to determine a primary candidate donor access node, receiving reference signals from the primary candidate donor access node at a transmission power higher than a transmission power of downlink information received from the primary candidate donor access node, evaluating at least one quality characteristic of the primary candidate donor access node, and, based on the quality characteristic meeting a predetermined threshold, requesting a connection to the primary candidate donor access node.

A method of information transmission includes receiving downlink information from a donor access node at a first transmission power, receiving reference signals from the donor access node at a second transmission power higher than the first transmission power, receiving downlink information from the donor access node transmitted in symbols that include the reference signals at a third transmission power lower than the first transmission power, and adjusting the first transmission power, the second transmission power, and the third transmission power so that the average transmission power over each symbol is equal between symbols that include reference signals and symbols that do not include reference signals.

DETAILED DESCRIPTION

Figure 1:
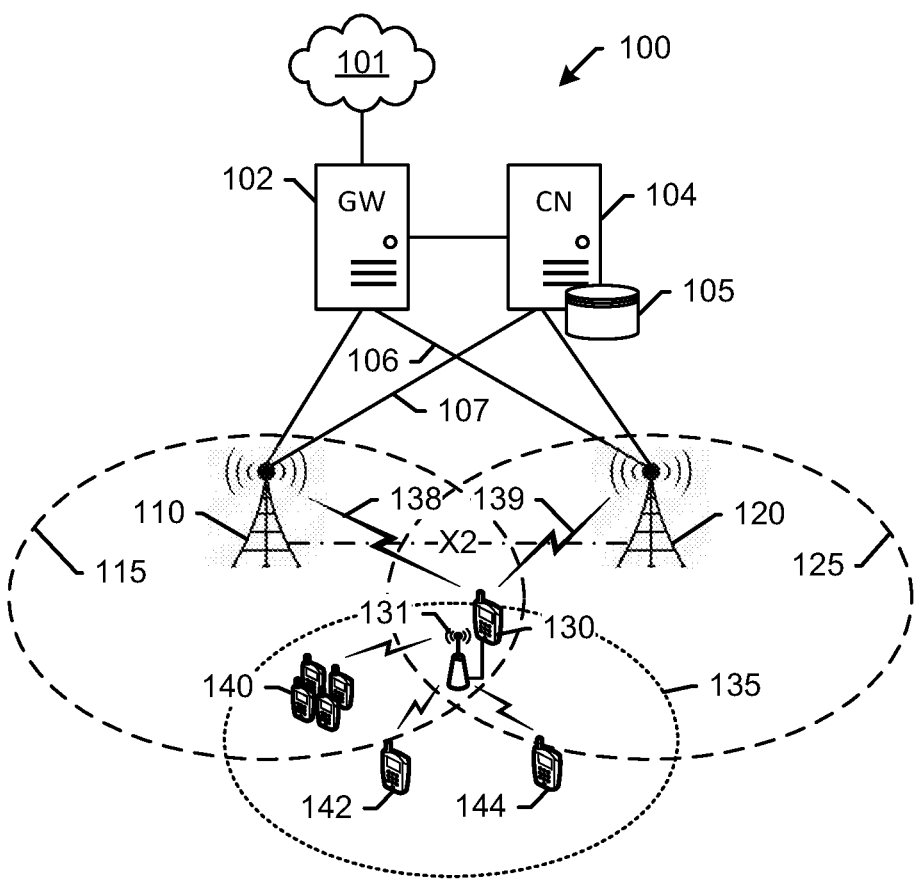
FIG. 1 depicts an exemplary system for donor selection.

In embodiments disclosed herein, a relay wireless device is enabled to determine a preferred donor access node from among a plurality of candidate donor access nodes that are within range of the relay wireless device. The preferred donor access node is able to satisfy a number of thresholds for reliable and efficient provision of services to end-user wireless devices via the relay wireless device. The relay wireless device measures or otherwise obtains characteristics of a plurality of access nodes that are nearby, or neighbor access nodes, and compares the characteristics with one or more thresholds to determine a preferred donor access node. Any access node that meets the threshold requirements is added to a list of candidate donor access nodes. The candidate donor access node that best meets the thresholds may be selected as the preferred donor access node, and a connection request submitted to the preferred donor access node.

Choosing a preferred access node may include identifying multiple possible donor access nodes and comparing various criteria such as, for example, distance between the relay wireless device and each possible donor access node, available headroom of each donor access node, (e.g., the headroom being equal to the number of physical resource blocks available, minus the number of physical resource blocks used), a quality score based on one or more quality characteristics such as signal to interference-plus-noise ratio, reference signal received quality, or other criteria.

In some situations, there may be multiple possible donor access nodes that exhibit similar quality characteristics. In such circumstances, choosing a preferred donor access node may be difficult because potential donor access nodes meet similar thresholds and one may not exhibit characteristics that clearly indicate superior connection performance over another donor access node. The present disclosure relates to methods and systems that facilitate relay wireless devices quantifying various quality indicators related to characteristics of a particular donor access node.

For example, once the relay wireless device is attached to a selected donor access node, the transmit power of resource elements carrying a reference transmitted by the selected donor access node is increased above a power level of downlink information transmitted from the selected donor access node. Increasing the power of the resource element carrying the reference signal can potentially improve the ability of the relay wireless device to evaluate (e.g., obtain, quantify) the downlink channel conditions associated with the selected donor access node. For example, increased power of the resource elements carrying the reference signal may facilitate the relay wireless device making measurements related to the reference signal power and quality, such as reference signal received power (RSRP) and reference signal received quality (RSRQ), thereby potentially providing more accurate information regarding the downlink channel conditions.

Increased reference signal power can also result in increased interference on a given cell, due to multiple neighboring reference elements transmitting at higher power. As a result, the signal-to-interference-plus-noise ratio (SINR) estimated for the downlink channel may degrade, leading to a relatively lower channel quality indicator (CQI) being reported to the relay wireless device. The donor access node to which the relay wireless device is attached may compensate for the lower CQI by implementing schemes that may decrease throughput, such as forward error correction (e.g. "turbo coding"). However, in some situations, any decrease in throughput resulting from the power increase of the reference signals is compensated for by the enhanced channel estimation and increased reception reliability leading to a reduction in retransmission rate.

The transmission power of the reference signals may be raised above the transmission power of the downlink information in symbols (e.g., orthogonal frequency-division multiplexing (OFDM) symbols) that do not include reference signals. In order to maintain a consistent average transmission power across the symbols, downlink information in symbols that include reference signals is reduced below a transmission power of the downlink information in symbols that do not include reference signals.

For access nodes adjacent to the donor access node, various schemes for reducing interference due to the higher power reference signals used by the donor access node may be employed. For example, in embodiments of the disclosure, inter-cell interference coordination (ICIC), such as enhanced inter-cell interference coordination (eICIC) may be enabled to mitigate such interference where coverage areas of adjacent access nodes meet.

The quality characteristics of the connection between the relay wireless device and the selected donor access node may be reevaluated based on the increased power reference signals. If such characteristics do not meet predetermined thresholds, reference signal power boosting is applied to the next donor access node on the list of candidate donor access nodes, and the process above is repeated. These and additional operations are further described with respect to the embodiments depicted in FIGS. 1-4 below.

FIG. 1 depicts an exemplary system 100 for donor selection. System 100 comprises a communication network 101, gateway 102, controller node 104, access nodes 110 and 120, relay wireless device 130, and end-user wireless devices 140, 142, and 144. In this embodiment, relay wireless device 130 relays services from one of access nodes 110, 120, to end-user wireless devices 140, 142, 144. To achieve this, relay wireless device 130 may be communicatively coupled to a mini-macro base station/access node 131. Mini-macro access node 131 acts as a wireless access point for wireless devices 140, 142, 144. Access node 110 is illustrated as having coverage area 115, and access node 120 is illustrated as having coverage area 125. Relay wireless device 130 is located within both coverage areas 115 and 120. Cluster of wireless devices 140 is located within coverage area 115, and wireless devices 142 and 144 are located outside either coverage area 115, 125, but within coverage area 135 of mini-macro access node 131. As a consequence, cluster of wireless devices 140 may access network services using the combination of relay wireless device 130 and mini-macro access node 131, rather than overload access node 110, which may be serving numerous other devices that are not shown. Moreover, wireless devices 142 and 144 that are outside ranges 115, 125 may access network services by virtue of being connected to relay wireless device 130 via mini-macro access node 131.

In operation, relay wireless device 130 is enabled to determine a preferred donor access node from among candidate donor access nodes 110, 120 that are within range. This determination is based on a comparison of a plurality of characteristics of each candidate donor access node 110, 120 with a number of thresholds for reliable and efficient provision of services to end-user wireless devices 140, 142, 144 via relay wireless device 130. The plurality of characteristics includes but is not limited to reliability characteristics, resource characteristics, and radio characteristics for each wireless communication link 138, 139 associated respectively with access nodes 110, 120. For example, reliability characteristics can include a block error rate (BER) or packet error rate (PER) of access nodes 110, 120, as reported by the access node, or as measured by relay wireless device 130. For example, a retransmission rate may be obtained for relay wireless device 130, and the retransmission rate is indicative of the error rate associated with one of access nodes 110, 120.

Further, resource characteristics may include resource availability for access nodes 110, 120. The resource availability includes an available throughput or bandwidth that is based, for instance, on resource block usage. Resource characteristics can also include a noise rise associated with one of wireless links 138, 139. For example, for every new wireless device added to a network, additional noise is added to the network. That is, each new wireless device causes a "noise rise". In theory, the "noise rise" is defined as the ratio of total received wideband power to the noise power. In some embodiments, the noise rise can be based on a signal-to-interference noise ratio (SINR) of relay wireless device 130 when connected to an access node 110, 120. A higher "noise rise" value implies that more wireless devices have attached to the network, and each wireless device has to transmit at a higher power to overcome the higher noise level. This means smaller path loss can be tolerated, and the cell radius is reduced. Since a higher noise rise means higher capacity and smaller footprint, a lower noise rise means smaller capacity and bigger footprint. In some embodiments, the noise rise of relay wireless device 130 may be higher if relay wireless device 130 is elevated or mounted on a pole. Although this improves radio visibility of connections 138, 139, it may increase the noise rise of the particular sector or access node and negatively affect performance of other wireless devices attached to the particular sector or access node. Thus, limited noise rise is a useful characteristic to evaluate a preferred donor access node.

These and other characteristics of access nodes 110, 120 may be measured by the relay wireless device, by the access node, in an uplink or downlink signal, or any combination thereof. For instance, errors and retransmissions of uplink packets can be measured at relay wireless device 130, while errors and retransmissions of downlink packets are measured at one or both of access nodes 110, 120, and transmitted to relay wireless device 130. In some embodiments, the characteristics of access nodes 110, 120, and communication links 138, 139 may vary based on a time of day, and can therefore be periodically measured or retrieved and stored in a local database of relay wireless device 130 over a period of time. In alternate embodiments, the time-varying trends and/or averages can be recorded on another database such as database 105 coupled to controller node 104, and retrieved by relay wireless device 130. In either case, relay wireless device 130 can refer to the stored characteristics when it determines a preferred donor access node, without having to repeatedly query access nodes 110, 120, or make repeated measurements.

Any access node that meets a chosen set of one or more threshold requirements from among access nodes 110, 120 (and other access nodes that are not shown) is added to a list of candidate donor access nodes. The candidate donor access node that best meets the thresholds may be selected as a preferred donor access node, and an initial connection request submitted to the preferred donor access node. Since the quality of the connection between the relay wireless device and a donor access node provides the backhaul for any wireless connection between the relay wireless device and end-user devices, the preferred donor access node is one that provides the highest and most reliable quality of service, based on meeting the thresholds, to the end-user wireless devices. Relay wireless device 130 may attempt to connect to a preferred donor access node, such as access node 110, by requesting to send a buffer status report to access node 110. Access node 110 can grant this request in a conventional manner. Relay wireless device 130 may respond to the grant by sending a short buffer status report. This short buffer status report is associated with a logical channel group that indicates the buffer status report is communicating the status of wireless device 130 as a relay, and thus is not asking for additional resource allocations (like a 'conventional' buffer status report would indicate). In other words, access node 110 is configured such that when a wireless device responds with a buffer status report for the 'special' logical channel group, it means that the buffer status report is not actually reporting the status of a buffer. Rather, this buffer status report indicates that wireless device 130 is now functioning as a relay.

In an embodiment, relay wireless device 130 can be configured to function as one or more of a layer 1 (L1), layer 2 (L2), or layer 3 (L3) relay. A layer 1 relay functions as a booster or repeater. In other words, a layer 1 relay device performs an amplify and forward (AF) function. RF signals received from donor access node 110 are amplified and transmitted by relay wireless device 130 to one or more of wireless devices 140, 142, 144. Likewise, RF signals received from wireless devices 140, 142, 144 are amplified and transmitted by relay wireless device 130 to a donor access node 110, 120. Alternatively or in addition, a layer 2 relay device performs a decode and forward (DF) function. RF signals received from donor access node 110 are demodulated and decoded, then encoded and modulated again before being transmitted by relay wireless device 130 to one or more of wireless devices 140, 142, 144. Likewise, RF signals received from one or more of wireless devices 140, 142, 144 are demodulated and decoded, then encoded and modulated again before being transmitted by relay wireless device 130 to donor access node 110. Alternatively or in addition, a layer 3 relay device also performs a decode and forward function. However, a layer 3 relay device also performs additional processing (such as ciphering and/or data concatenation/segmentation/reassembly). In other words, relay wireless device 130 performs demodulation and decoding of the received RF signals (either uplink or downlink), processes received data, then encodes, modulates, and transmits the data to one or more of wireless devices 140, 142, 144.

Wireless devices 130, 140, 142, 144 may be any device, system, combination of devices, or other such communication platform capable of communicating wirelessly with access nodes 110, 120 using one or more frequency bands deployed by access nodes 110, 120. Wireless devices 130, 140, 142, 144 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 120. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 130, etc. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communications links 106, 107, 108, 109 may include S1 communications links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing access node characteristics. The software comprises computer programs, firmware, or some other form of machine-readable instructions, and may include an operating system, utilities, drivers, network interfaces, applications, or some other type of software, and combinations thereof. Controller node 107 can receive instructions and other input at a user interface.

Access nodes 110, 120 can be any network node configured to provide communication between wireless devices 130, 140, 142, 144, and communication network 101. Access nodes 110, 120 can be standard access nodes and/or short range, low power, small access nodes. A standard access node can be a macrocell access node such as a base transceiver station, a radio base station, an eNodeB device, or an enhanced eNodeB device, or the like. In an exemplary embodiment, a macrocell access node can have a coverage area 115, 125 in the range of approximately five kilometers to thirty-five kilometers and an output power in the tens of watts. A small access node can include a microcell access node, a picocell access node, a femtocell access node, or the like such as a home NodeB or a home eNodeB device. Moreover, it is noted that while access nodes 110, 120 are illustrated in FIG. 1, any number of access nodes can be implemented within system 100.

Access nodes 110, 120 can comprise a processor and associated circuitry to execute or direct the execution of computer-readable instructions to obtain information. Access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 110, 120 can receive instructions and other input at a user interface. Access nodes 110, 120 communicate with gateway node 102 and controller node 104 via communication links 106, 107.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, 120 and communication network 101.

Figure 2:
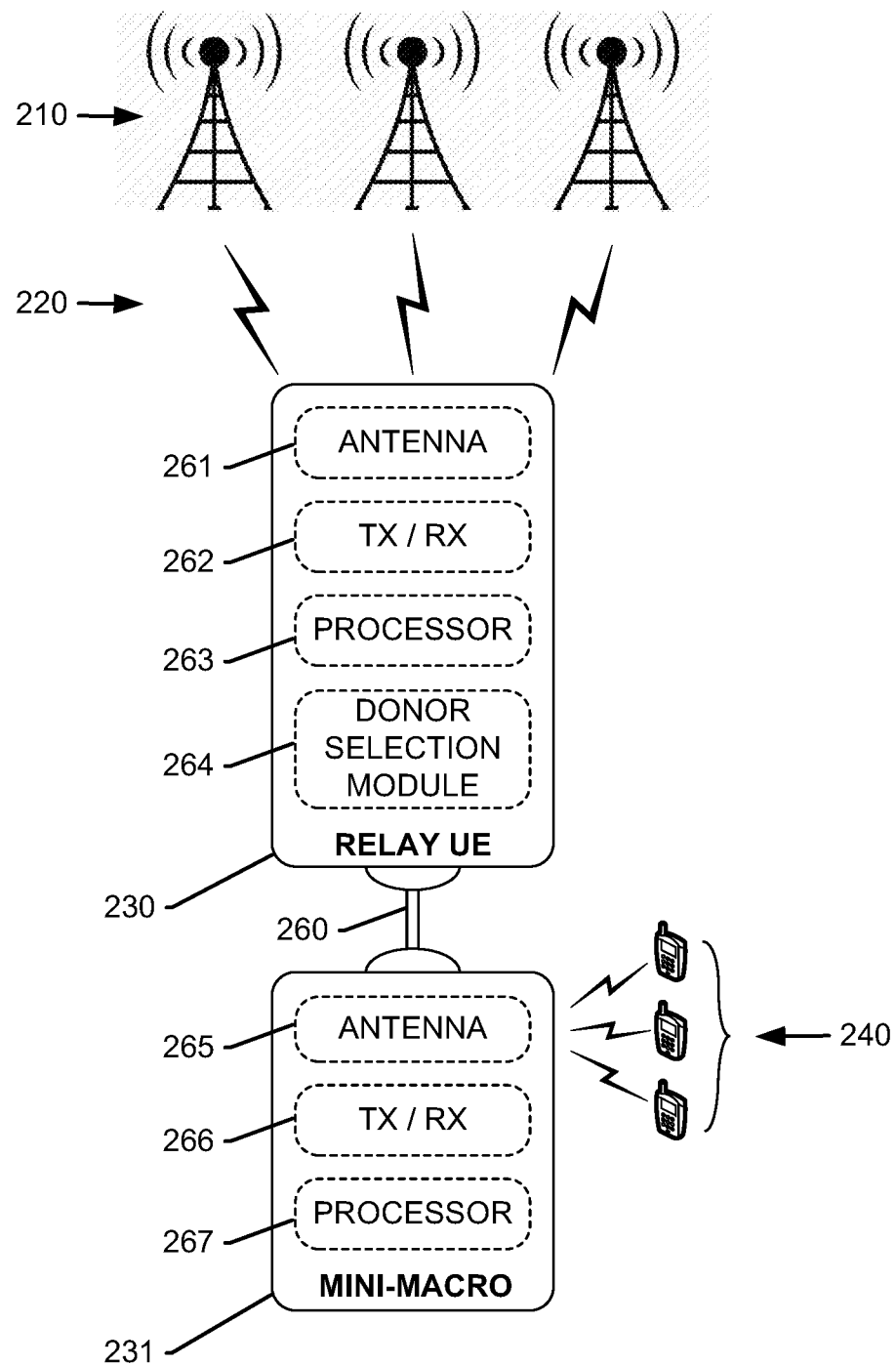
FIG. 2 depicts an exemplary relay wireless device coupled to a mini-macro access node.

FIG. 2 depicts an exemplary relay wireless device 230 coupled to a mini-macro access node 231. Relay wireless device 230 is illustrated as comprising an antenna 261 for direct (i.e. unrelayed) communication with one or more of access nodes 210 via communication links 220, a transceiver 262, a processor 263, and a donor selection module 264 for enabling relay wireless device 230 to perform donor selection operations described herein, for example with reference to FIG. 4. Further, relay wireless device 230 is coupled to mini-macro base station or access point 231 via a communication interface 260. Communication interface 260 may be any interface that enables direct communication between relay wireless device 230 and mini-macro 231, such as USB, FireWire, or any other serial, parallel, analog, or digital interface. Mini-macro access node 231 is illustrated as comprising an antenna 265 for wireless communication with end wireless devices 240, a transceiver 266, and a processor 267. Although only one transceiver is depicted in each of relay wireless device 230 and mini-macro access node 231, additional transceivers may be incorporated in order to facilitate communication across interface 260 and other network elements.

Figure 3:
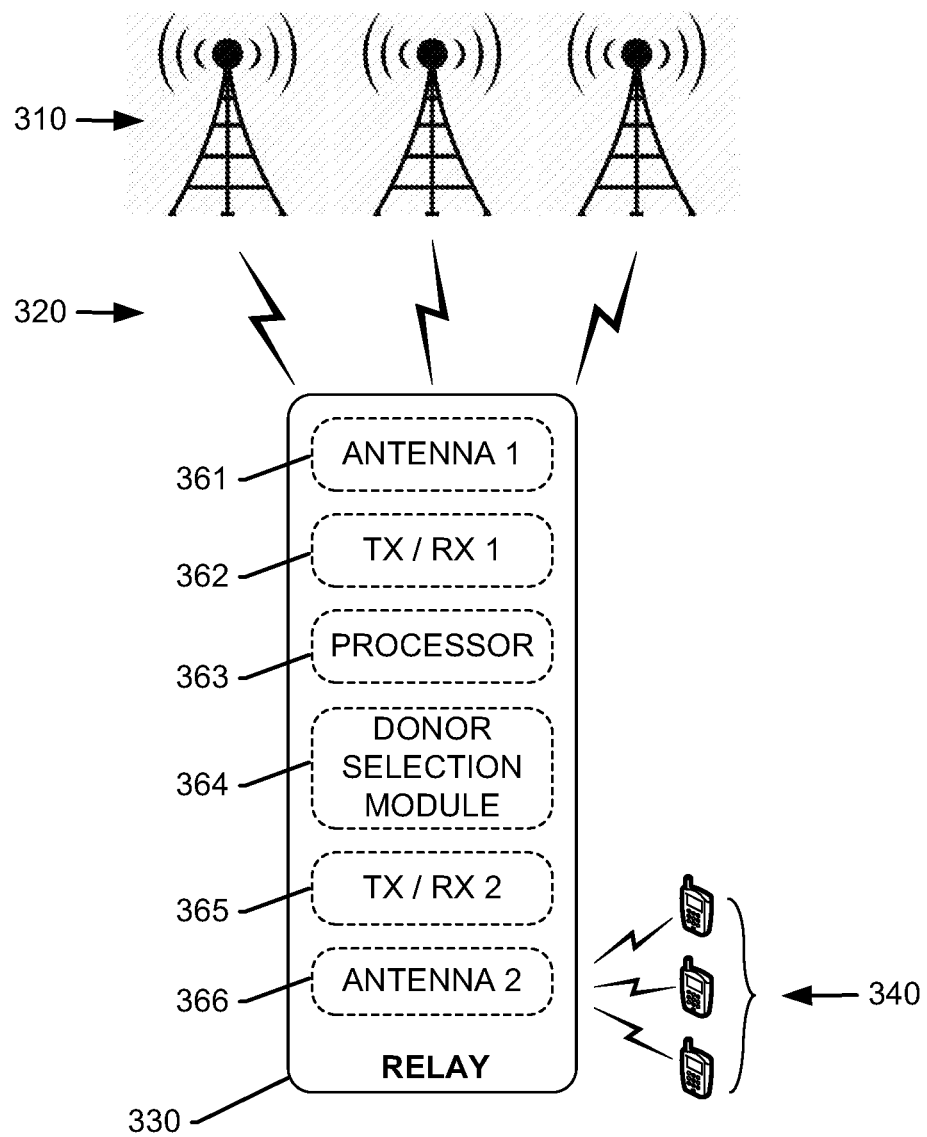
FIG. 3 depicts an exemplary relay access node combining a relay wireless device and a mini-macro access node.

FIG. 3 depicts an exemplary relay access node 330. Relay access node is a combination of the relay wireless device 230 and mini-macro 231 depicted in FIG. 3. However, the separate-but-connected combination of relay wireless device 230 and mini-macro 231 may also be referred to as a relay access node. In this case, relay access node 330 is illustrated as comprising a first antenna 361 for direct communication with one or more of access nodes 310 via communication links 320, a first transceiver 362, a processor 363, a donor selection module 364 for enabling relay access node 330 to perform donor selection operations described herein (for example with reference to FIG. 4), a second transceiver 365, and a second antenna 366 for wireless communication with end wireless devices 340. Although only two transceivers are depicted in relay access node 330, additional transceivers may be incorporated in order to facilitate communication with other network elements.

Figure 4:
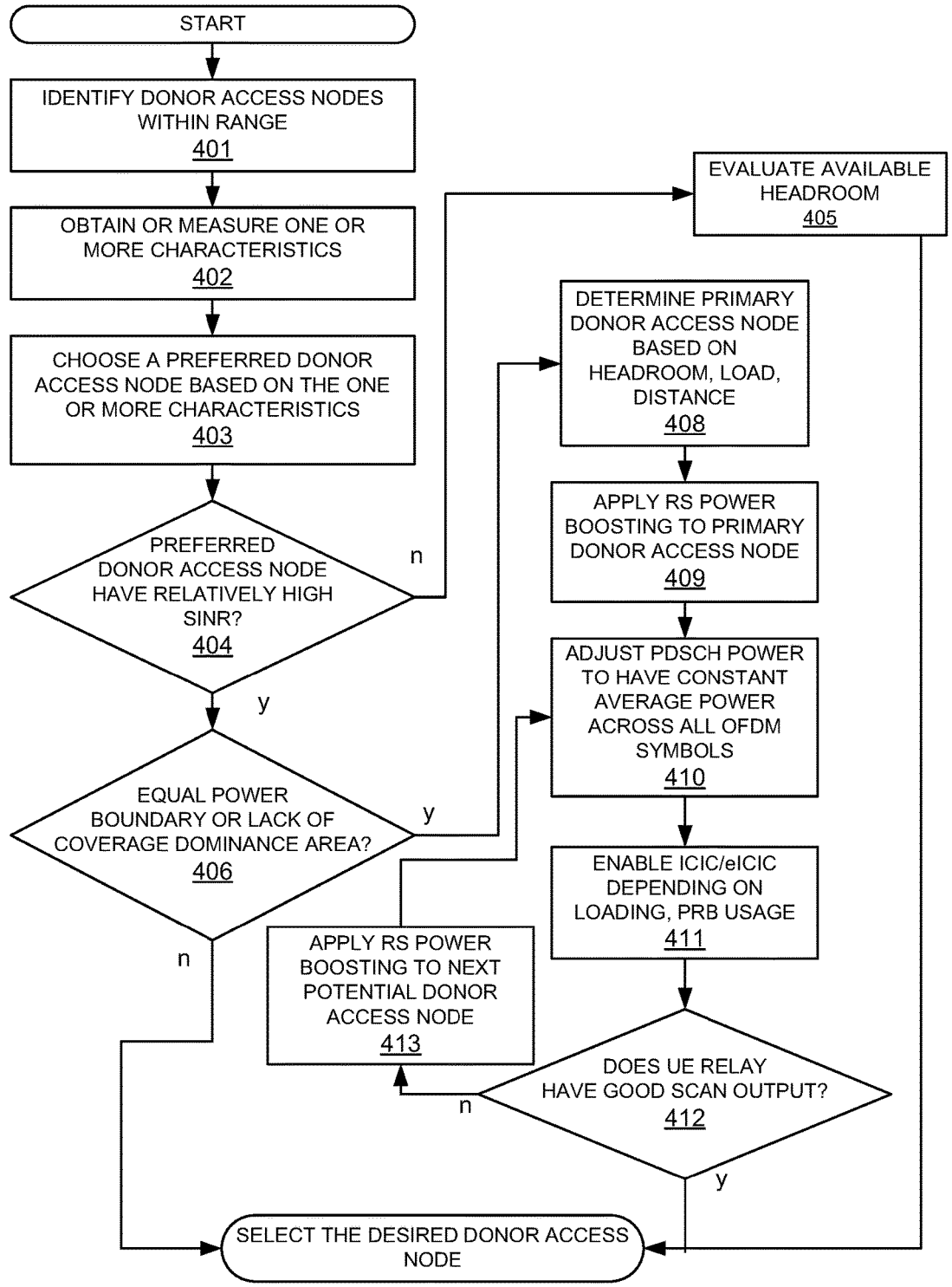
FIG. 4 depicts an exemplary method for donor selection.

FIG. 4 depicts an exemplary method for donor selection. The method is generally discussed with reference to elements within the system 100 (FIG. 1). For example, the method comprises operations that may be performed by relay wireless device 130 (FIG. 1). In other embodiments, the method can be implemented with any suitable network element. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 401, a relay wireless device identifies donor access nodes within which the relay wireless device is in range. Any access node may be a potential candidate donor access node at this stage of operation. At 402, the relay wireless device obtains or measures one or more characteristics (e.g., quality characteristics) of each available donor access node. The one or more characteristics may include, but are not limited to, reliability characteristics, resource characteristics, and radio characteristics. For example, reliability characteristics can include, without limitation, a block error rate or packet error rate, a retransmission rate for uplink or downlink packets transmitted between the donor access node and wireless devices attached thereto, signal to interference-plus-noise ratio, reference signal received power, reference signal received quality, a channel quality indicator, or other measures of reliability.

Other characteristics of the candidate donor access nodes may be evaluated at 402. For example, characteristics such as distance between the relay wireless device and each candidate donor access node and the available headroom of each candidate donor access node may be measured or evaluated at 402. In an exemplary embodiment, a capacity headroom score may be evaluated based on the available physical resource blocks, minus the number of physical resource blocks in use.

Based on the one or more characteristics, the candidate donor access nodes are arranged in a list, with a preferred candidate donor access node (e.g., a donor access node exhibiting the most ideal characteristic or combination of characteristics) listed first and the remaining candidate donor access nodes in descending order based on the one or more evaluated characteristics. At 403, the preferred donor access node is chosen from the list of candidate donor access nodes.

At 404, the signal-to-noise-plus-interference ratio of the preferred candidate donor access node is compared to that of the other candidate donor access nodes on the list. If the preferred candidate donor access node has a signal-to-noise-plus-interference ratio that is not significantly higher than the other candidate donor access nodes on the list, the available headroom of the preferred donor access node is evaluated at 405. If the available headroom indicates the preferred candidate donor access node has sufficient headroom to accommodate the relay wireless device, the preferred candidate donor access node is selected and the relay wireless device attaches to the preferred candidate donor access node.

If the preferred candidate donor access node does have a relatively high signal-to-noise-plus-interference ratio compared to the other candidate donor access nodes on the list, the method proceeds to 406. At 406, if the preferred candidate donor access node is clearly dominant in terms of power, the relay wireless device requests a connection with the preferred candidate donor access node. If the relay wireless device is located at an equal power boundary with multiple candidate donor access nodes, or if there is otherwise a lack of coverage dominance by a particular candidate donor access node, a primary donor access node is chosen from among the potential donor access nodes based on one or more characteristics such as headroom, load, and distance from the relay wireless device.

For example, at 408, one or more characteristics of each potential donor access node may be combined to again form a list of the candidate donor access nodes based on one or more characteristics, such as quality characteristics. The one or more characteristics may be the same or different from those evaluated at 402, and the list generated at 408 may be the same as, or different from, the list generated at 402. For example, in an embodiment, the one or more characteristics evaluated at 408 may include at least one signal quality measurement, such as signal-to-noise-and-interference ratio, reference signal received quality, or another measure of signal quality. As a further non-limiting example, the at least one signal quality measurement evaluated at 408 may be a signal quality measurement that is not evaluated at 402. In an exemplary embodiment, at 408, the available headroom of each candidate donor access node, the usage load on each candidate donor access node, and the distance from the relay wireless device to each donor access node are evaluated, and a secondary list (e.g., ranking) of candidate donor access nodes is generated based on the headroom, load, and distance. In other exemplary embodiments, additional or different characteristics, such as the quality characteristics discussed in connection with 402, may also be evaluated and may influence the order of the donor access nodes on the secondary list at 408. In one embodiment, the characteristics used to generate the secondary list may be assigned a weight (e.g., quantitative factors may be multiplied by a factor-specific weighting coefficient) and combined (e.g., summed) to form a single quantitative score by which the candidate donor access nodes are ranked at 408, and a primary donor access node is chosen based on the ranking.

At 409, one or more reference signals transmitted by the primary donor access node are transmitted at a power level higher than a power level at which the primary donor access node transmits downlink information (e.g., physical downlink shared channel (PDSCH) information). The relatively higher transmission power of the reference signals may facilitate the relay wireless device making measurements of the signal quality and strength of the reference signals. For example, the higher transmission power of the reference signals may enable the relay wireless device to more accurately and reliably measure the reference signal received power (RSRP) and the reference signal received quality (RSRQ) characteristics.

In exemplary embodiments, at 410, the transmission power of the reference signals, and the transmission power of the downlink information transmitted in symbols (e.g., OFDM symbols) that include reference signals, is adjusted so that the total power transmitted across the symbols in a given physical resource block (PRB) is constant. For example, downlink information in symbols that do not include reference signals is transmitted at a first power level, and the reference signals are transmitted at a second power level higher than the first power level. Downlink information transmitted in symbols that include the reference signals is transmitted at a third power level lower than the first power level, and the second and third power levels are adjusted so that the average power transmitted in a symbol including reference signals is equal to the average power transmitted in a symbol including only downlink information and no reference signals.

The difference between the transmission power of the resource elements carrying reference signals, and the transmission power of the resource elements carrying downlink information in symbols that do not include reference signals, may be expressed by a parameter $P_A$. The transmission power level of resource elements carrying downlink information in symbols that include reference signals may be lower than the transmission power level of the resource elements carrying downlink information in symbols that do not carry reference signals. The difference between the transmission power of the resource elements carrying the downlink information in symbols that do not include reference signals, and the transmission power of the downlink information in symbols that do include reference signals, may be expressed as a ratio $P_B$. As non-limiting examples, in embodiments of the disclosure, the parameter $P_A$ may range from 0 to 7 decibels (dB), while $P_B$ may range from 0 to 3.

The parameter $P_A$ determines another parameter, $\rho_A$, which is the ratio of the transmission power of the reference signals and the transmission power of downlink information in symbols without reference signals. Similarly, the parameter $P_B$ determines another parameter $\rho_B$, which is the ratio of the transmission power of the reference signals and the transmission power of downlink information in symbols that include the reference signals. As a non-limiting example, in an exemplary embodiment, a cell specific ratio $\rho_B/\rho_A$ ranges from 5/4 to 1/2, depending on the value of $P_B$ and the number of antenna ports, as shown in Table 1 below.

TABLE 1

| $P_B$ | $\rho_B/\rho_A$ | |
|---|---|---|
| | One Antenna Port | Two and Four Antenna Ports |
| 0 | 1 | 5/4 |
| 1 | 4/5 | 1 |
| 2 | 3/5 | 3/4 |
| 3 | 2/5 | 1/2 |

As a specific, non-limiting example of transmission power levels in accordance with an exemplary embodiment of the disclosure, the reference signals may be transmitted with a power level of −50.00 dBm, and the downlink information in symbols not including reference signals may be transmitted with a power level of −54.77 dBm. The downlink information in symbols that include reference signals may be transmitted with a power level of −58.75 dBm. These power levels are provided by way of example only, and a person of ordinary skill in the art would understand that transmission power levels greater than or less than those described above fall within the scope of the disclosure.

Figure 5:
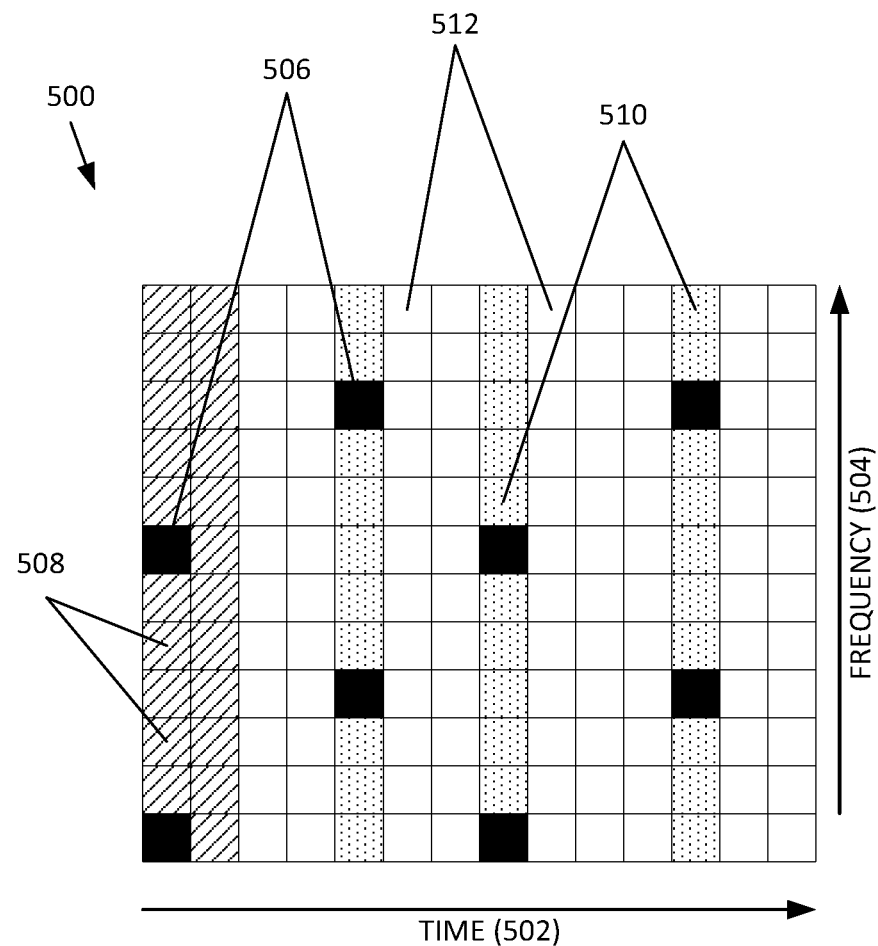
FIG. 5 depicts an exemplary schematic representing resource elements in a physical resource block.

Referring now to FIG. 5, a schematic view of a physical resource block 500 according to an exemplary embodiment is shown. The physical resource block 500 includes 14 OFDM symbols on axis 502 encompassing 12 subcarrier frequencies arranged along axis 504. Resource elements 506 carry reference signals, and resource elements 508 carry physical downlink control channel (PDCCH) signals. Resource elements 510 carry downlink information in symbols in which the reference signals are present, i.e., symbols 1, 5, 8, and 12. Resource elements 512 carry downlink information in symbols that do not include the reference signals, i.e., symbols 3, 4, 6, 7, 9-11, 13, and 14. The resource elements 512 that carry downlink information in symbols that do not include reference signals are transmitted at a first power level. Under conditions in which the reference signals are transmitted at a power higher than the downlink information, such as, for example, at act 409, the reference signals in resource elements 506 are transmitted at a second power level greater than the first power level.

To maintain a constant transmission power over all the symbols, the transmission power of the downlink information in symbols that include reference signals is reduced to a third power level lower than the first power level. The ratio between the second power level and the third power level is adjusted so that the average transmission power of the resource elements across the subcarriers in symbols with reference signals is equal to the average transmission power of the resource elements across the subcarriers in the symbols that do not include reference signals. Stated another way, the sum of the transmission power across all the subcarriers is adjusted to be equal between symbols by reducing the transmission power of the downlink information in symbols with reference signals to compensate for the increased power of the reference signals.

Because the higher power reference signal can potentially cause interference that compromises throughput, various interference mitigation schemes can be applied to improve the data transmission performance. For example, referring again to FIG. 4, at 411, protocols such as inter-cell interference coordination (ICIC) or enhanced ICIC (eICIC) may be implemented as needed based on factors such as loading and physical resource block usage. In some exemplary embodiments, such interference mitigation protocols may be enabled whenever the relay wireless device recognizes that the reference signals from the donor access node are being transmitted at a power higher than a transmission power of downlink information.

Under some conditions, connection to a donor access node that is transmitting reference signals at an elevated power level leads to a relative decrease in throughput due to inter-cell interference resulting from the higher power associated with one cell interfering with an adjacent cell. Accordingly, the relay wireless device may be enabled to determine when a donor access node is transmitting the reference signals at an elevated power level and choose a different donor access node. For example, in some embodiments, the relay wireless device may be configured to read a system information block (e.g., SIB-2) to evaluate the actual power at which the reference signals are being transmitted. Based on information regarding the whether the reference signals are being transmitted at an elevated power level, the relay wireless device may automatically decline connection with the first donor access node on the list of candidate donor access nodes, and may proceed to evaluate the quality and/or reliability characteristics of the next (e.g., second or secondary) donor access node on the list of candidate donor access nodes.

At 412, the relay wireless device evaluates (e.g., reevaluates) the connection with the primary candidate donor access node. For example, the relay wireless device may evaluate one or more characteristics relating to the quality of the connection with the primary candidate donor access node. The one or more characteristics evaluated at 412 may include the same characteristics evaluated at 402, or may include one or more different characteristics from those evaluated at 402. For example, such characteristics as a channel quality indicator, signal-to-noise-and-interference-ratio, reference signal received quality, reference signal received power, or other characteristics may be evaluated based on the connection with the primary donor access node transmitting elevated power reference signals. If the one or more characteristics indicate the relay wireless device can achieve a connection with the primary donor access node having sufficient quality (e.g., based on a predetermined threshold of the one or more characteristics), then the relay wireless device requests a connection with the primary donor access node and the relay wireless device attaches to the primary donor access node. In an exemplary embodiment, criteria for requesting the connection may include a combination of the parameters noted above or a combination of one or more parameters in addition to one or more of the parameters listed above.

If, at 412, the one or more quality characteristics indicate that the connection with the primary donor access node fails to meet the predetermined threshold and cannot provide a connection of sufficient quality, the next (e.g., second, secondary) donor access node on the list of donor access nodes generated at 408 is chosen. At 413, the power of the reference signals transmitted by the next donor access node is boosted, and the method proceeds according to acts 410-412. This process may be repeated as many times as necessary for the relay wireless device to achieve a quality connection with a donor access node in the list of donor access nodes generated at 408 until the list of potential donor access nodes is exhausted.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 310, wireless devices 130, 330, and/or network 101.

Figure 6:
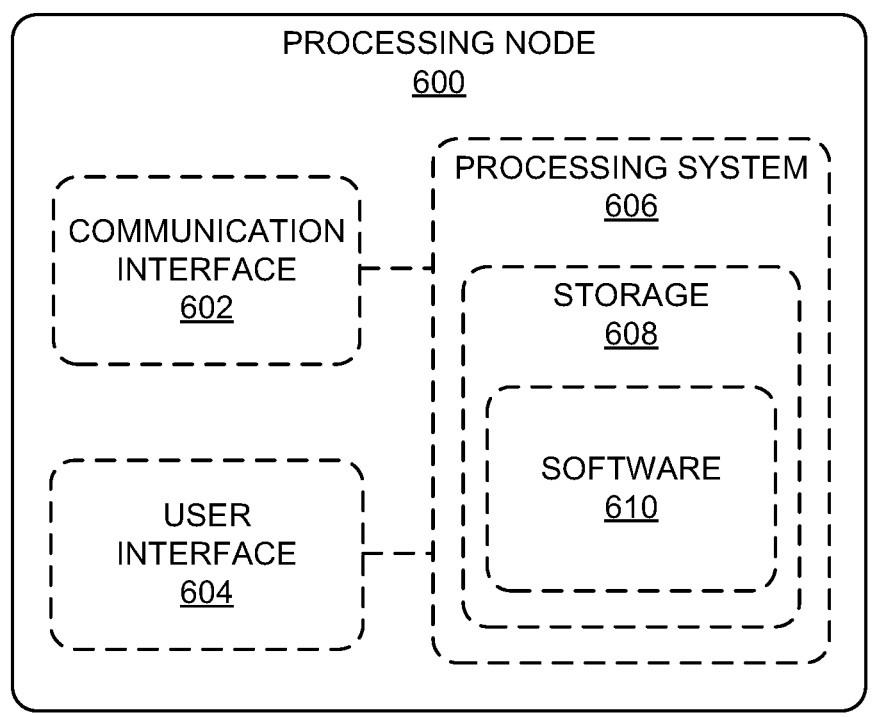
FIG. 6 depicts an exemplary processing node.

FIG. 6 depicts an exemplary processing node 600 comprising communication interface 602, user interface 604, and processing system 606 in communication with communication interface 602 and user interface 604. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. For example, storage 608 may include a buffer. Software 610 may include computer programs, firmware, or some other form of machine-readable instructions, including an operating system, utilities, drivers, network interfaces, applications, or some other type of software. For example, software 610 may include a call admission control module. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for donor selection in a relay access node, the method comprising:
    identifying a plurality of candidate donor access nodes;
    obtaining one or more characteristics associated with each of the plurality of candidate donor access nodes;
    determining a primary donor access node based on a comparison of the one or more characteristics between each of the plurality of candidate donor access nodes;
    receiving a reference signal transmitted by the primary donor access node at a transmission power higher than a transmission power of downlink information transmitted by the primary donor access node;
    evaluating one or more quality characteristics of the primary donor access node; and
    based on the one or more quality characteristics meeting a predetermined threshold, requesting a connection to the primary donor access node.

2. The method of claim 1, wherein determining a primary donor access node comprises ranking the plurality of donor access nodes based on the comparison of the one or more characteristics.

3. The method of claim 2, wherein ranking the plurality of donor access nodes comprises identifying a secondary donor access node based on the comparison of the one or more characteristics between each of the plurality of candidate donor access nodes.

4. The method of claim 3, further comprising requesting a connection to the secondary donor access node if the one or more quality characteristics of the primary donor access node fail to meet the predetermined threshold.

5. The method of claim 3, further comprising receiving a reference signal transmitted by the secondary donor access node having a transmission power higher than a transmission power of downlink information transmitted from the secondary donor access node.

6. The method of claim 5, further comprising evaluating one or more quality characteristics of the secondary donor access node.

7. The method of claim 6, further comprising requesting a connection with the secondary donor access node based on the one or more quality characteristics of the secondary donor access node meeting a predetermined threshold.

8. The method of claim 1, wherein the one or more quality characteristics comprise one or both of a signal-to-noise plus interference ratio and a reference signal received quality.

9. The method of claim 1, further comprising adjusting a transmission power of downlink information transmitted by the primary donor access node in symbols with reference signals so that the average power transmitted in symbols with reference signals is equal to an average power transmitted in symbols without reference signals.

10. The method of claim 9, wherein adjusting the transmission power of downlink information transmitted in symbols with reference signals comprises reducing the transmission power of downlink information in symbols with reference signals below a transmission power of downlink information transmitted in symbols without reference signals.

11. A system for donor access node selection, the system comprising:
  a relay access node configured to relay wireless services from a donor access node to one or more wireless devices; and
  a processor communicatively coupled to the relay access node, the processor to execute operations comprising:
    ranking one or more candidate donor access nodes according to at least one characteristic to determine a primary candidate donor access node;
    receiving reference signals from the primary candidate donor access node at a transmission power higher than a transmission power of downlink information received from the primary candidate donor access node;
    evaluating at least one quality characteristic of the primary candidate donor access node; and
    based on the quality characteristic meeting a predetermined threshold, requesting a connection to the primary candidate donor access node.

12. The system of claim 11, wherein the processor is further configured to determine whether the transmission power of the reference signals exceeds the transmission power of the downlink information.

13. The system of claim 12, wherein the processor is further configured to request a connection to a secondary candidate donor access node based on the transmission power of the reference signals exceeding the transmission power of the downlink information.

14. The system of claim 11, wherein the processor is further configured to determine whether the relay access node is located at an equal power boundary between multiple candidate donor access nodes of the one or more candidate donor access nodes.

15. A method of information transmission in a relay access node, the method comprising:
  receiving downlink information from a donor access node at a first transmission power;
  receiving reference signals from the donor access node at a second transmission power higher than the first transmission power;
  receiving downlink information from the donor access node transmitted in symbols that include the reference signals at a third transmission power lower than the first transmission power; and
  adjusting the first transmission power, the second transmission power, and the third transmission power so that the average transmission power over each symbol is equal between symbols that include reference signals and symbols that do not include reference signals.

16. The method of claim 15, further comprising enabling inter-cell interference coordination based on one or more use factors including loading of a selected donor access node and physical resource block usage.

17. The method of claim 15, further comprising evaluating one or more quality characteristics to quantify a connection between a primary donor access node and the relay access node.

18. The method of claim 17, further comprising requesting a connection with the primary donor access node based on the evaluating the one or more quality characteristics.

19. The method of claim 17, further comprising requesting a connection with a secondary donor access node based on the evaluating the one or more quality characteristics.

20. The method of claim 15, further comprising:
  determining that the reference signals are transmitted at a higher transmit power than the downlink information; and
  selecting a second donor access node based on determining that the reference signals are transmitted at a higher transmit power than the downlink information.

\* \* \* \* \*